Patented May 21, 1946

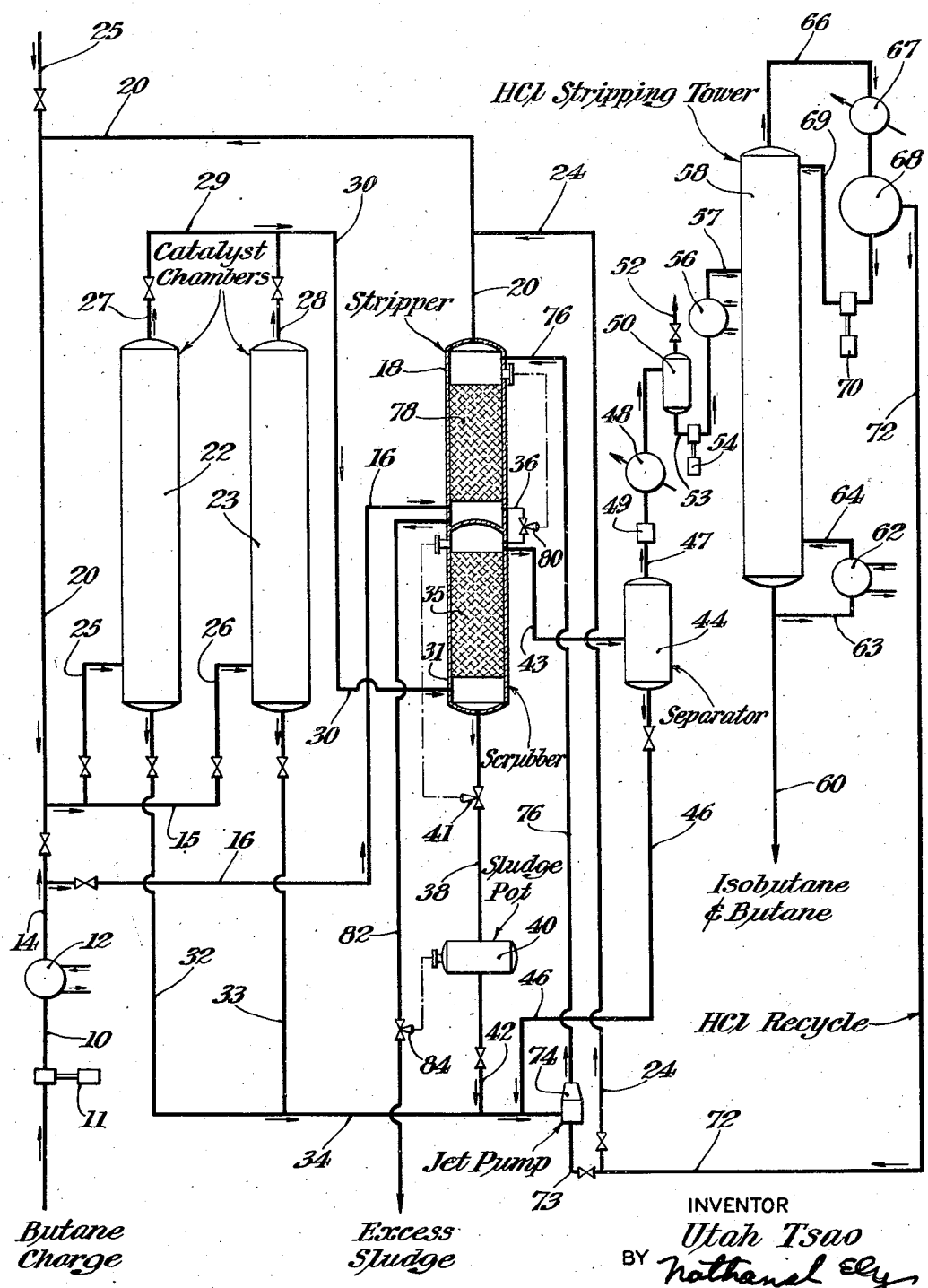

2,400,669

UNITED STATES PATENT OFFICE 2,400,669

ISOMERIZATION OF PARAFFINIC HYDROCARBONS

Utah Tsao, New York, N. Y., assignor to The Lummus Company, New York, N. Y., a corporation of Delaware Application December 10, 1942, Serial No. 468,495

10 Claims. (Cl. 260—683.5)

This invention relates to an improvement in the conversion of hydrocarbons and particularly to an improved method for carrying out the isomerization of normal or slightly branched chain hydrocarbons to branched chain or more highly branched chain hydrocarbons in the presence of an aluminum halide catalyst such as aluminum chloride. It is especially useful in the isomerization of normal butane to isobutane.

The catalytic effect of the aluminum halides, particularly anhydrous aluminum chloride, in the conversion of various hydrocarbon materials to other and more desirable hydrocarbon products is well known. In the operation of such processes, a finely divided aluminum halide may be suspended in the hydrocarbon mixture to be converted; and the reaction may be carried out as a batch or as a continuous procedure, as desired, with subsequent separation of the converted products from the catalyst. Such processes may also be conducted in such a way that the hydrocarbon reactants, generally in the vapor state, are brought into contact with the aluminum halide catalyst; in such case, the vapors are passed over the catalyst, which is suitably contained or supported in a reactor or similar vessel. The catalyst either may be used by itself or may be deposited on an appropriate, preferably inert carrier.

Recently, the use of anhydrous aluminum chloride as a catalyst for various hydrocarbon conversions, particularly the isomerization of normal butane to isobutane, has attained considerable importance and has attracted widespread attention. In the operation of a continuous process utilizing this catalyst, however, several disadvantages generally arise to lower the efficiency of the process.

Because of its relatively high vapor pressure, aluminum chloride, although normally a solid, partially vaporizes or sublimes under the conditions of reaction so that aluminum chloride vapors are carried off with the vaporous products of conversion. It is to be noted that aluminum chloride sublimes at approximately 183° C. under substantially atmospheric pressure. This vaporized aluminum chloride causes considerable difficulty in the hydrocarbon vapor condenser; for, as the vaporous hydrocarbon products are condensed, the aluminum chloride vapors are likewise condensed and deposited on the condenser surface. As a result, the deposit of aluminum chloride gradually increases until the condenser finally becomes so plugged that it must be shut down for cleaning.

In addition, a sludge comprising a complex reaction product of aluminum chloride and hydrocarbons is formed during the reaction. This sludge must be continuously removed from the process and replaced by fresh aluminum chloride in order that an effective degree of conversion can be maintained. Generally, however, this sludge dissolves or entrains a small amount of still catalytically active aluminum chloride, which it is desirable to recover for maximum operating efficiency. It is to be noted that aluminum chloride is slightly soluble in various hydrocarbons and in its hydrocarbon complex.

Accordingly, the primary object of my invention is to provide an improved process wherein the above-noted disadvantages are substantially avoided.

A further object of my invention is the provision of an improved system for the separation and recovery of entrained aluminum chloride vapors from vaporous hydrocarbon mixtures.

Another object of my invention is the provision of an improved system for recovering the active aluminum chloride entrained by the complex aluminum chloride-hydrocarbon sludge formed in aluminum chloride-catalyzed hydrocarbon conversions.

A particular object of my invention is to provide a combined system for the separation of vaporized aluminum chloride entrained by hydrocarbon vapors and for the recovery of entrained active aluminum chloride from its hydrocarbon complex in the operation of a butane isomerization process.

Further objects and advantages of my invention will be apparent from the following description thereof taken in connection with the accompanying drawing showing a flow sheet of one system for carrying out my invention.

For convenience only, my invention will be described in connection with the isomerization of normal butane to isobutane in the presence of anhydrous aluminum chloride as the catalyst although it is applicable to any vapor phase hydrocarbon conversion system in which an aluminum halide is used as the catalyst.

According to my invention, the isobutane conversion products are passed to a scrubber, wherein they are brought into contact with the aluminum chloride-hydrocarbon sludge, which acts to scrub out the entrained and vaporized aluminum chloride from the reaction products. The conversion products, freed of catalyst vapors, are fractionated for separation of the desired isobutane product. The sludge containing the separated but still active aluminum chloride is combined with similar sludge from the reactors; and the resulting mixture is passed to a stripper, wherein it is contacted with incoming normal butane charge vapors, which serve to strip the entrained or dissolved aluminum chloride from the sludge. The butane vapors now containing vaporized aluminum chloride are passed to the catalytic reactors, and a portion of the stripped sludge is then returned to the scrubber for reuse therein.

In the operation of my invention, the normal butane charge is introduced into the system through line 10 by means of pump 11. This butane charge may comprise any suitable mixture containing normal butane in sufficient concentration and may comprise a $C_4$ fraction obtained from natural gas or a $C_4$ fraction obtained from cracking gases or the like. Where the isomerization system is used in conjunction with an alkylation unit to provide the isobutane feed therefor, this butane charge may comprise the normal butane fraction separated from the alkylation products in the alkylation unit. The incoming butane charge is generally introduced into the system under a pressure sufficient to maintain it in liquid condition. A heater 12 is provided to vaporize this charge and to raise it to the necessary reaction temperature before it is brought into contact with the isomerization catalyst.

The vaporized butane is then passed through line 14 into manifold 15 and into line 16. The portion passed through line 16 is conducted to stripper 18, wherein it countercurrently contacts the complex aluminum chloride-hydrocarbon sludge formed during the isomerization reaction. This sludge contains entrained particles of aluminum chloride which is still catalytically active and which it is desirable to recover. As will be explained in greater detail hereinafter, this entrained aluminum chloride is stripped from the sludge by the incoming butane charge vapors. The butane vapors containing the stripped aluminum chloride are removed from stripper 18 through line 20 and are conducted to manifold 15 for introduction into the catalyst chambers or reactors 22 and 23. Prior to introduction into these reactors, the butane vapors are admixed with gaseous hydrocarbon chloride, which is recycled to the system through line 24. This hydrogen chloride acts as an accelerator or activator for the aluminum chloride catalyst and is necessary for the production of satisfactory yields of isobutane. The hydrogen chloride gas should be substantially anhydrous to prevent interference with the isomerization reaction. Desirably, it should comprise about 7 mol per cent of the charge vapors. If necessary, additional or makeup hydrogen chloride gas may be introduced into the system through line 28.

Manifold 15 conducts the butane charge vapors comprising the two portions of the initial charge, one of which has been circulated through stripper 18 and contains the stripped aluminum chloride and the recycled hydrogen chloride, to the catalyst chambers or reactors 22 and 23 through lines 25 and 26, respectively. These reactors contain the anhydrous aluminum halide catalyst, which preferably consists of pieces of solid aluminum chloride of suitable size. It is to be noted, however, that the aluminum chloride catalyst may also be supported on a suitable carrier, which may be inert or slightly catalytically active as desired. Although I have shown two catalytic reactors, only one may be provided, or more than two may be employed. The number used depends on the desired throughput of the isomerization unit since, when the solid nonsupported aluminum chloride is used as the catalyst, the butane charge vapors can be passed in parallel through all of the reactors and need not be alternately passed through the several reactors provided.

Within reactors 22 and 23, a substantial portion of the normal butane is isomerized to isobutane by the action of the aluminum chloride thereon. These reactors may be desirably maintained at a temperature of about 190° F. and a pressure of about 165 lbs. per sq. in. gage. The vaporous hydrocarbon conversion products including the isobutane formed are removed from reactors 22 and 23 through lines 27 and 28, respectively, into manifold 29, which conducts them through line 30 to scrubber 31 for a purpose more fully described hereinafter.

During the isomerization reaction, the aluminum chloride tends to sublime and also tends to form a complex compound with the hydrocarbons undergoing conversion. Both of these characteristics of aluminum chloride result in a loss of catalyst, which must be replaced from time to time in order to maintain the desired throughput. The complex compound that is formed results in a sludge, which may be conveniently removed from reactors 22 and 23 through lines 32 and 33, respectively, into manifold 34. As this sludge is formed, however, aluminum chloride particles which are still catalytically active are entrained therein and are withdrawn therewith from the reactors. For economic reasons it is desirable to recover this entrained catalyst. According to my invention, this sludge is introduced into stripper 18 wherein it comes into contact with butane charge vapors, which servo to strip out the entrained vaporizable aluminum chloride. In this way, the entrained catalyst is recovered and returned to the catalyst reactors for reuse in the process, and undue loss of catalyst is avoided.

Because of the gradual sublimation of the solid aluminum chloride during the reaction, aluminum chloride vapors are carried off along with the hydrocarbon product vapors. This sublimation characteristic of the catalyst represents a material factor in the economic operation of the isomerization process and would account for a material operating loss if it were not counteracted. Accordingly, it is highly desirable to recover this entrained vaporized catalyst, not only for economic reasons, but also to prevent deposition of aluminum chloride in the subsequent hydrocarbon vapor condensers with the consequent plugging of the condenser surface.

According to my invention, this vaporized aluminum chloride is separated from the hydrocarbon product vapors prior to condensation thereof by a novel method. As already noted, these product vapors are introduced into scrubber 31 through line 30. Within scrubber 31, these vapors flow upwardly and countercurrently contact a complex aluminum chloride-hydrocarbon sludge, which serves to substantially scrub the entrained aluminum chloride from the hydrocarbon product vapors. For this purpose, scrubber 31 is desirably filled with a suitable packing material 35, over which the aluminum chloride sludge downwardly trickles. This sludge is obtained from stripper 18 and is passed therefrom by gravity to scrubber 31 through line 36. Accordingly, this sludge is substantially free of or lean in entrained aluminum chloride particles and, thus, forms an excellent scrubbing medium for the separation of the vaporized aluminum chloride from the isobutane product vapors.

The sludge containing the separated aluminum chloride is removed from scrubber 31 through bottoms line 38 into the sludge pot 40. Removal of this sludge is controlled by valve 41, which is operated by the level of the sludge in the top of scrubber 31. This sludge level is desirably maintained above the top of the packing 35 so that an effective scrubbing action of the product vapors is continuously provided. The sludge is discharged from sludge pot 40 through line 42 into manifold 34 for recovery of the aluminum chloride contained therein.

The isobutane product vapors, substantially freed of entrained aluminum chloride, are withdrawn from scrubber 31 through line 43 and are passed to separator 44, wherein any sludge that may be carried over with these vapors is separated. Such separated sludge is removed through line 46 desirably into manifold 34. The product vapors are then passed through line 47 to condenser 48 for substantially complete condensation. There is relatively little danger that aluminum chloride will be deposited on the condensing surface of this condenser since it has been substantially completely removed by the scrubbing action of the sludge in scrubber 31. If desired, however, the hydrocarbon vapors may first be passed through a chamber 49 (conventionally shown) containing an adsorptive clay or the like for the separation of any remaining traces of aluminum chloride. The resulting condensate is collected in accumulator 50 provided with valved vent line 52.

This isobutane condensate is withdrawn from accumulator 50 through line 53 by means of pump 54, which forces it through heat exchanger 56, wherein the condensate is partially vaporized. Sufficient heat is supplied in exchanger 56 to insure the vaporization of at least all of the hydrogen chloride. The partly vaporized condensate is introduced through line 57 into stripping tower 58, wherein conditions are so maintained that the hydrogen chloride is substantially entirely stripped from the isobutane product. Tower 58 is desirably operated at a superatmospheric pressure in the range of 450 lbs. per sq. in. and at a charge temperature of about 190° F. This isobutane product is removed substantially free of hydrogen chloride through bottoms line 60 and may be subjected to suitable fractionation for the separation and recovery of the isobutane; or, where the isomerization unit is used in conjunction with an alkylation unit, such product may be passed directly to the alkylation reactors. Heat for the stripping action in tower 58 may be provided by passing a portion of the bottoms stream through reboiler 62 as by means of lines 63 and 64. The overhead from tower 58 is removed through line 66 for partial condensation in condenser 67, the discharge from which is collected in accumulator 68. This overhead contains all of the hydrogen chloride, substantially all of the propane, and a trace of the isobutane present in the effluent from reactors 22 and 23. The resulting condensate is returned as reflux for tower 58 through line 69 as by means of pump 70. The uncondensed hydrogen chloride and propane are withdrawn through line 72 for recycling to the isomerization reactors through lines 24 and 20.

In accordance with my invention, a sufficient portion of this uncondensed recycled hydrogen chloride gas is diverted from line 72 through line 73 and is passed to jet pump 74 (conventionally shown), to which manifold 34 is connected. The motivating action of the hydrogen chloride vapors serves to pump the sludge from manifold 34 through line 76 to the top of stripper 18, wherein it countercurrently contacts a suitable stripping medium to strip the entrained aluminum chloride therefrom. Preferably, this stripping medium comprises the butane charge vapors introduced thereinto by line 16. The hydrogen chloride admixed with the sludge is conveniently separated therefrom in the top of stripper 18 and is removed along with the butane charge vapors through line 20. Stripper 18 is also provided with a suitable packing material 78, over which the sludge trickles downwardly in contact with the rising butane vapors. These vapors strip out the aluminum chloride which is entrained in the sludge, and the temperature in stripper 18 is maintained sufficiently high so that substantially all of the aluminum chloride is stripped out of the sludge by reason of its sublimation characteristic. As previously noted, the butane charge vapors containing the stripped aluminum chloride are removed through line 20 and are passed to reactors 22 and 23. It will thus be seen that this procedure prevents undue loss of the aluminum chloride catalyst in the sludge, which is then discharged from the system for disposal as waste.

The complex aluminum chloride-hydrocarbon sludge, free of entrained aluminum chloride, collects in the bottom of stripper 18, from which a portion is passed through line 36 to scrubber 31 for the purpose of scrubbing entrained and vaporized aluminum chloride from the isobutane product vapors. Desirably, the temperature in scrubber 31 is maintained sufficiently low so that an effective scrubbing action is accomplished. The flow of the sludge through line 36 is governed by valve 80, which is operated by the level of the sludge in the top of stripper 18. Preferably, this sludge level is maintained above the top of the packing 78 so that an effective contact between the sludge and the butane vapors is continuously obtained. The balance of the substantially aluminum chloride-free sludge is discharged from stripper 18 and from the system through line 82. The flow through this line is controlled by valve 84, the position of which is governed by the level of the sludge in sludge pot 40.

It will be apparent that certain changes can be made in the system described without varying the scope of my invention. For example, any other type of suitable pump may be used in place of jet pump 74; and, in such case, all the hydrogen chloride is recycled through line 24 from line 72. The use of a jet pump or the like has certain advantages, however; for the difference in the operating pressures maintained in stripping tower 58 and in reactors 22 and 23, the former of which is operated at a considerably higher pressure than the latter, may then be utilized. Stripper 18 and scrubber 31 are conveniently maintained at substantially the same pressure under which the reactors are operated. If desirable or necessary, all the recycled hydrogen chloride may be passed through jet pump 74. In addition, all of the incoming butane charge vapors may be passed directly through line 16 to stripper 18 to act as the stripping medium. Furthermore, although I have shown stripper 18 and scrubber 31 as being fabricated in a single unit, these two towers may be constructed separately; in the arrangement shown, however, no pump is needed in line 36.

It will be apparent that the advantages of my invention are two-fold. Not only do I provide for the separation of the entrained aluminum chloride from the isobutane product vapors, but I also provide for the recovery of still active aluminum chloride catalyst entrained in the complex sludge which is formed during the reaction. I have provided a compact operating system wherein the sludge serves to separate the vaporous aluminum chloride from the isobutane product vapors and the incoming butane charge vapors serve to strip the aluminum chloride thus recovered and entrained by the sludge.

It will be apparent that my invention is not limited in its application to the isomerization of normal butane to isobutane. My invention is equally applicable to other hydrocarbon vapor phase reactions catalyzed by anhydrous solid aluminum chloride wherein vaporous aluminum chloride is carried off with the reaction product vapors and wherein still active aluminum chloride is entrained in the complex sludge that is formed. Such reactions include other isomerization reactions such as the conversion of normal pentane to isopentane or the conversion of a predominantly straight-chain, low octane number naphtha to a branched-chain naphtha of a higher antiknock rating, alkylation reactions such as the alkylation of isobutane with a butylene or the alkylation of isopentane with propylene to form a highly isoparaffinic motor fuel of high antiknock value, polymerization reactions such as the polymerization of normally gaseous olefins to gasoline, and the like.

Furthermore, particularly in the starting up of my process, a complex aluminum chloride-hydrocarbon sludge derived from any suitable source may be used as the scrubbing medium in scrubber 31. Such sludge may be obtained, for example, from the reaction between olefinic hydrocarbons and aluminum chloride.

While I have described a preferred form of embodiment of my invention, I am aware that modifications may be made thereto; therefore, only such limitations as appear in the claims appended hereinafter should be imposed.

I claim:

1. In the catalytic vapor phase conversion of hydrocarbons in the presence of anhydrous aluminum chloride wherein the hydrocarbon vapors to be reacted are passed in contact with the aluminum chloride and the aluminum chloride gradually vaporizes under the conditions of operation, the steps of recovering the aluminum chloride vapors from the reaction product vapors which comprise countercurrently contacting the reaction product vapors with a complex aluminum chloride-hydrocarbon sludge to substantially scrub the aluminum chloride vapors therefrom, then countercurrently contacting the sludge containing the scrubbed aluminum chloride with incoming hydrocarbon charge vapors to substantially strip the aluminum chloride therefrom, and passing the hydrocarbon vapors containing the stripped aluminum chloride to the catalytic reaction.

2. In the catalytic vapor phase conversion of hydrocarbons in the presence of anhydrous aluminum chloride wherein the hydrocarbon vapors to be reacted are passed in contact with the aluminum chloride and the aluminum chloride gradually vaporizes under the conditions of operation, the steps of recovering the aluminum chloride vapors from the reaction product vapors which comprise countercurrently contacting the reaction product vapors with a complex aluminum chloride-hydrocarbon sludge to substantially scrub the aluminum chloride vapors therefrom, then countercurrently contacting the sludge containing the scrubbed aluminum chloride with incoming hydrocarbon charge vapors to substantially strip the aluminum chloride therefrom, passing the hydrocarbon vapors containing the stripped aluminum chloride to the catalytic reaction, and recycling the sludge substantially free of aluminum chloride to the scrubbing step.

3. In the isomerization of normal butane to isobutane in the presence of anhydrous aluminum chloride and hydrogen chloride gas wherein normal butane vapors admixed with the hydrogen chloride are passed in contact with the aluminum chloride and the aluminum chloride gradually vaporizes under the conditions of operation, the steps of recovering the aluminum chloride vapors from the isobutane product vapors which comprise countercurrently contacting the isobutane product vapors with a complex aluminum chloride-hydrocarbon sludge to substantially scrub the aluminum chloride vapors therefrom, then countercurrently contacting the sludge containing the scrubbed aluminum chloride with incoming normal butane charge vapors to substantially strip the aluminum chloride therefrom, passing the normal butane vapors containing the stripped aluminum chloride to the catalytic isomerization, returning the sludge substantially free of aluminum chloride to the scrubbing step by gravity, fractionating the isobutane product vapors substantially free of aluminum chloride at a higher pressure than that maintained on the stripping step to separate the hydrogen chloride gas therefrom, and utilizing this high pressure hydrogen chloride gas to move the sludge from the scrubbing step to the stripping step.

4. In the isomerization of paraffinic hydrocarbons in the presence of solid anhydrous aluminum chloride wherein hydrocarbon vapors to be isomerized are passed in contact with the aluminum chloride and wherein the aluminum chloride gradually vaporizes under the conditions of operation and wherein a complex aluminum chloride-hydrocarbon sludge is formed and aluminum chloride is entrained by this sludge, the steps of recovering the vaporized and entrained aluminum chloride which comprises countercurrently contacting the sludge with incoming hydrocarbon charge vapors to substantially strip the entrained aluminum chloride therefrom, passing such hydrocarbon vapors containing the stripped aluminum chloride to the catalytic isomerization, passing sludge substantially free of entrained aluminum chloride in countercurrent contact with the isomerization product vapors to substantially scrub the aluminum chloride vapors therefrom, returning the sludge containing the scrubbed aluminum chloride to the stripping step, and eliminating from the system the excess sludge substantially free of entrained aluminum chloride.

5. In the isomerization of normal butane to isobutane in the presence of solid anhydrous aluminum chloride and hydrogen chloride gas wherein normal butane vapors admixed with the hydrogen chloride are passed in contact with the aluminum chloride and wherein the aluminum chloride gradually vaporizes under the conditions of operation and wherein a complex aluminum chloride-hydrocarbon sludge is formed and aluminum chloride is entrained by this sludge, the steps of recovering the vaporized and entrained aluminum chloride which comprises cuntercurrently contacting the sludge with incoming normal butane charge vapors to substantially strip the entrained aluminum chloride therefrom, passing such normal butane vapors containing the stripped aluminum chloride to the catalytic isomerization, countercurrently contacting the isobutane product vapors with sludge substantially free of entrained aluminum chloride to substantially scrub the aluminum chloride vapors therefrom, passing sludge from the stripping step to the scrubbing step by gravity, eliminating from the system the excess sludge substantially free of entrained aluminum chloride, combining the sludge from the scrubbing step with the sludge from the catalytic isomerization, fractionating the isobutane product vapors substantially free of aluminum chloride at a pressure higher than that maintained on the stripping step to separate the hydrogen chloride gas therefrom, and utilizing this high pressure hydrogen chloride gas to move the combined sludge to the stripping step.

6. The method as claimed in claim 5, which includes dividing the incoming normal butane charge vapors and passing one portion thereof directly to the catalytic isomerization.

7. The method as claimed in claim 5, which includes dividing the separated hydrogen chloride gas into two portions and recycling one portion thereof directly to the catalytic isomerization.

8. The method as claimed in claim 5, which includes conducting the stripping and scrubbing steps in packed columns and maintaining the upper level of the sludge above the top of the packing in each column.

9. In a catalytic vapor phase hydrocarbon conversion process employing an aluminum halide catalyst and producing vaporous conversion products and also producing a sludge and wherein said catalyst is subject to vaporization and removal with the conversion products and is also subject to entrainment by said sludge and removal therewith, the steps for recovering the catalyst so removed with the conversion products and with the sludge, comprising passing incoming hydrocarbon charge vapors in contact with the removed sludge to strip the entrained catalyst from the sludge, passing said vapors bearing the catalyst stripped from the sludge to the conversion, subsequently passing the vaporous conversion products in contact with said sludge from which the catalyst has been stripped to scrub the catalyst from said products, and employing in said stripping step the sludge bearing the catalyst so scrubbed from the conversion products.

10. In a continuous catalytic vapor phase hydrocarbon conversion process employing an aluminum halide catalyst and producing vaporous conversion products and also producing a sludge and wherein said catalyst is subject to vaporization and removal with the conversion products and is also subject to entrainment by said sludge and removal therewith, the steps for recovering the catalyst so removed with the conversion products and with the sludge, comprising continuously passing the removed sludge through a packed stripping zone, continuously passing incoming hydrocarbon charge vapors in contact with the sludge within the stripping zone to strip the entrained catalyst from the sludge, continuously passing said vapors bearing the catalyst stripped from the sludge to the conversion, continuously passing the sludge after employment thereof in the stripping zone through a packed scrubbing zone, continuously passing the vaporous conversion products through a packed scrubbing zone and in contact therein with said sludge from which the catalyst has been stripped to scrub the catalyst from said products, and continuously passing the sludge bearing the catalyst so scrubbed from the conversion products from the scrubbing zone to the stripping zone for use in said stripping step.

UTAH TSAO.